US012123576B1

(12) United States Patent
Liu

(10) Patent No.: US 12,123,576 B1
(45) Date of Patent: Oct. 22, 2024

(54) RECHARGEABLE SUBMERSIBLE POOL LIGHTS

(71) Applicant: Huizhou Jukai Technology Co, Ltd, Guangdong (CN)

(72) Inventor: Tianming Liu, Guangdong (CN)

(*) Notice: Subject to any disclaimer, the term of this patent is extended or adjusted under 35 U.S.C. 154(b) by 0 days.

(21) Appl. No.: 18/586,822

(22) Filed: Feb. 26, 2024

(51) Int. Cl.

| | |
|---|---|
| ***F21V 19/02*** | (2006.01) |
| ***E04H 4/14*** | (2006.01) |
| ***F21V 5/04*** | (2006.01) |
| ***F21V 7/00*** | (2006.01) |
| ***F21V 23/06*** | (2006.01) |
| ***F21V 31/00*** | (2006.01) |
| ***F21W 131/401*** | (2006.01) |
| ***F21Y 105/18*** | (2016.01) |

(52) U.S. Cl.
CPC .............. *F21V 19/02* (2013.01); *F21V 5/048* (2013.01); *F21V 7/0083* (2013.01); *F21V 23/06* (2013.01); *F21V 31/005* (2013.01); *E04H 4/148* (2013.01); *F21W 2131/401* (2013.01); *F21Y 2105/18* (2016.08)

(58) Field of Classification Search
CPC ........ F21V 19/02; F21V 5/048; F21V 7/0083; F21V 23/06; F21V 31/005; E04H 4/148; F21W 2131/401; F21Y 2105/18
See application file for complete search history.

(56) References Cited

U.S. PATENT DOCUMENTS

| | | | | |
|---|---|---|---|---|
| 6,152,571 | A * | 11/2000 | Ruiz | F21S 8/024 362/267 |
| 9,539,952 | B2 * | 1/2017 | Gebhard | F21V 5/04 |
| 2006/0176686 | A1 * | 8/2006 | McVicker | F21S 9/022 362/183 |
| 2010/0109556 | A1 * | 5/2010 | Mosholder, Jr. | F21S 9/037 362/183 |
| 2014/0265842 | A1 * | 9/2014 | Potucek | H05B 47/185 315/77 |
| 2017/0074475 | A1 * | 3/2017 | Rosado Rios | H02S 40/38 |
| 2018/0238533 | A1 * | 8/2018 | Dyck | F21V 31/005 |
| 2020/0386388 | A1 * | 12/2020 | Dyck | F21V 21/30 |
| 2021/0262638 | A1 * | 8/2021 | Zhao | F21S 9/037 |

* cited by examiner

*Primary Examiner* — Tsion Tumebo
(74) *Attorney, Agent, or Firm* — Hawaii Patent Services; Nathaniel K. Fedde; Kenton N. Fedde

(57) ABSTRACT

The present invention relates to a rechargeable submersible pool lights, which comprises a swimming pool lamp, wherein a lens component and a light source board are arranged in the swimming pool lamp, the lens component is arranged on the light source board, and the swimming pool lamp is provided with a charging port and a waterproof component corresponding to the charging port; and an angle adjusting seat detachably connected below the swimming pool lamp, wherein the angle adjusting seat comprises a rotating table and a fixed table, and the rotating table and the fixed table are rotatably connected.

19 Claims, 12 Drawing Sheets

RECHARGEABLE SUBMERSIBLE POOL LIGHTS

TECHNICAL FIELD

The present invention relates to the technical field of lighting equipment, in particular to a rechargeable submersible pool lights.

BACKGROUND

Swimming pool lamp is an important decoration and lighting equipment of swimming pool, which can not only increase the beauty of swimming pool, but also improve the efficiency and safety of swimming pool.

However, there are some common problems in the swimming pool lamps on the market at present, which affect the performance and quality of swimming pool lamps. First of all, the lighting range of the pool lamps is not far enough to cover the whole area of the pool, resulting in dark corners and dead corners of the pool, which is not conducive to the cleaning and maintenance of the pool, and also brings visual inconvenience and insecurity to users. Secondly, the charging port of the swimming pool lamp is not waterproof, and it is easy to be eroded and polluted by water, which leads to the shortening of the life or failure of the swimming pool lamp, and even the dangerous accident of electric leakage, which poses a threat to the life and property of users. Thirdly, the lighting of swimming pool lamps can't adjust the angle, which is not flexible enough and has a poor impression.

For example, the swimming pool lamp with an application number of 11599630 has the problems that the range of the lamp is not far, and the angle of the lamp cannot be adjusted, so it cannot provide enough brightness and clarity, and the viewing degree is not enough; similarly, the swimming pool lamp with an application number of 10124935 has the problems of short lighting range and insufficient waterproof treatment of the charging port, which may lead to the shortening of the life of the swimming pool lamp or the failure of its function, and even the dangerous accident of electric leakage.

Therefore, it is necessary for us to put forward a brand-new swimming pool lamp, which has a long range, a better sealing effect of the charging port, and the lighting angle can be adjusted, which can provide users with a better experience and a better choice of swimming pool lamps.

SUMMARY

The present invention provides a rechargeable submersible pool lights, which includes:

- a swimming pool lamp, wherein a lens component and a light source board are arranged in the swimming pool lamp, and the lens component is arranged on the light source board, wherein the swimming pool lamp is provided with a charging port and a waterproof component corresponding to the charging port; and
- an angle adjusting seat arranged below the swimming pool lamp, wherein the angle adjusting seat includes a rotating table and a fixed table, and the rotating table and the fixed table are rotatably connected; and wherein, the rotating table is detachably connected with the swimming pool lamp,
- a fixing ring groove is arranged on the swimming pool lamp, a fixing protrusion is arranged on the rotating table, and the fixing protrusion corresponds to the fixing ring groove; a limiting groove is also arranged on the swimming pool lamp, and a limiting part is arranged on the rotating table, and the limiting part corresponds to the limiting groove; and
- wherein, the fixed table includes a free end, and a fixing hook is arranged at the free end, and the fixing hook corresponds to the fixing ring groove; and the fixed table is detachably connected with the swimming pool lamp.

The present invention provides a rechargeable submersible pool lights, which includes:

- a swimming pool lamp, wherein a lens component and a light source board are arranged in the swimming pool lamp, a plurality of light emitting sources are arranged on the light source board, and the lens component is covered on the light source board; and
- wherein, the lens component includes a lens cover and a spot lamp shade, wherein the spot lamp shade is arranged on the light emitting source, and the spot lamp shade includes a diverging surface and a condensing surface; the lens cover is arranged on the light emitting source and the spot lamp shade, and a condensing part is arranged on the lens cover, and the condensing part corresponds to the spot lamp shade; and
- wherein the swimming pool lamp is provided with a charging port and a waterproof component corresponding to the charging port, and the waterproof component is rotatably connected to the swimming pool lamp; and
- wherein, the waterproof component includes a waterproof plug, which is detachably connected to the swimming pool lamp, and the swimming pool lamp is provided with a buckling groove, and a limiting protrusion is arranged on the waterproof plug, and the limiting protrusion corresponds to the buckling groove; and
- an angle adjusting seat detachably connected below the swimming pool lamp, wherein the angle adjusting seat includes a rotating table and a fixed table, and the rotating table and the fixed table are rotatably connected.

The present invention further provides a swimming pool decoration method, which includes the following steps: providing a plurality of powerful lighting devices for the swimming pool;

- wherein the lighting device includes a swimming pool lamp, wherein a lens component and a light source board are arranged in the swimming pool lamp, and the lens component is arranged on the light source board, wherein the swimming pool lamp is provided with a charging port and a waterproof component corresponding to the charging port; and an angle adjusting seat detachably connected below the swimming pool lamp, wherein the angle adjusting seat includes a rotating table and a fixed table, and the rotating table and the fixed table are rotatably connected; and
- the decoration method includes the following steps:
- charging the lighting devices sufficiently; and
- fixing the lighting devices in the swimming pool where lighting is needed; and
- rotating the angle adjusting seat to adjust the light of the swimming pool lamp to a required angle.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the Figures.

Figure 1:
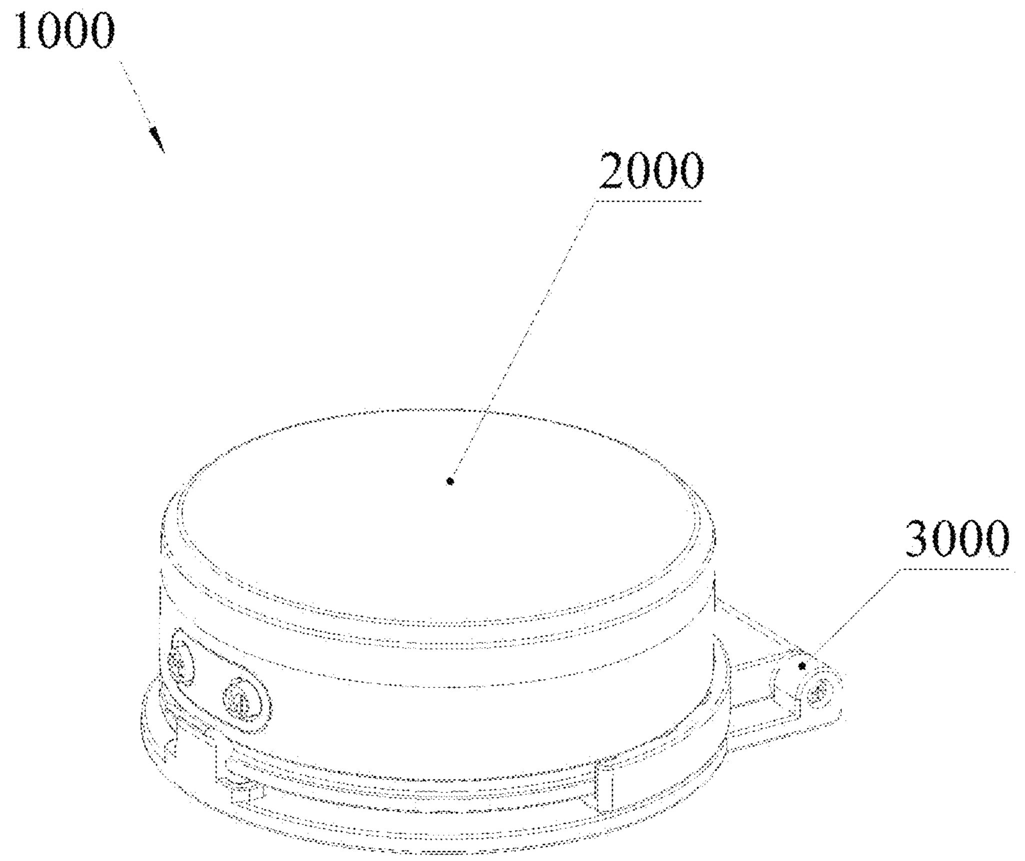
FIG. 1 is a schematic view of a lighting device.

Lighting device (1000); Housing (1001); Accommodating groove (1002); Embedding groove (1003); Embedding protrusion (1004); Rechargeable battery (1005); Control button (1006); Swimming pool lamp (2000); Lens component (2001); Light source board (2002); Light source (2003); Lens cover (2004); Spot lamp shade (2005); Diverging surface (2006); Condensing surface (2007); Condensing part (2008); Charging port (2009); Waterproof component (2010); Waterproof plug (2011); Buckling groove (2012); Limiting protrusion (2013); Free end (2014); Fixing hook (2015); First spot lamp part (2016); First diffusing groove (2017); First convex mirror (2018); Second convex mirror (2019); Second diffusing groove (2020); Second spot lamp part (2021); Third convex mirror (2022); Frustum wall (2023); Refraction surface (2024); Condensing wall (2025); Waterproof groove (2026); Fixing member (2029); First fixing part (2030); Second fixing part (2031); First fixing groove (2032); Second fixing groove (2033); Rotating part (2034); First rotating groove (2035); Second rotating groove (2036); Diffusing part (2037); Sealing ring (2038); Abutting groove (2039); Magnetic attraction member (2040); Angle adjusting seat (3000); Rotating table (3001); Fixed table (3002); First fixing hole (3003); Second fixing hole (3004); Fixing ring groove (3005); Fixing protrusion (3006); Limiting groove (3007); Limiting part (3008); Connector (3009).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being “on,” “coupled to,” or “connected to” another element or layer, it can be directly on, directly coupled to or directly connected to the other element or layer, or intervening elements or layers may be present. In contrast, when an element is referred to as being “directly on,” “directly coupled to,” or “directly connected to” another element or layer, there are no intervening elements or layers present. Like numbers refer to like elements throughout. As used herein, the term “and/or” includes any and all combinations of one or more of the associated listed items.

As used in the description of the inventive concept and the appended claims, the singular forms “a,” “an,” and “the” are intended to include the plural forms as well, unless the context clearly indicates other.

As shown in FIGS. 1 to 12, the present invention provides a rechargeable submersible pool lights. The lighting device 1000 includes a swimming pool lamp 2000. In the swimming pool lamp 2000, a lens component 2001 and a light source board 2002 are arranged, and a plurality of light sources 2003 are arranged on the light source board 2002. The lens component 2001 is covered on the light source board 2002 to adjust the light direction and distribution of the light emitting sources. The lighting device can effectively improve the lighting effect and aesthetics of the swimming pool, save energy and reduce the cost.

Wherein, the lens component 2001 includes a lens cover 2004 and a spot lamp shade 2005, which is arranged on the light source 2003, and the spot lamp shade 2005 includes a diverging surface 2006 and a condensing surface 2007. The lens cover 2004 covers the light source 2003 and the spot lamp shade 2005, and a condensing part 2008 is arranged on the lens cover 2004, and the condensing part 2008 corresponds to the spot lamp shade 2005. In some embodiments, the reflector and the lens cover are integrally formed and fixedly connected.

Wherein, the diverging surface is opposite to the light source and used for diverging the light of the light source outwards, and the condensing surface is connected with the diverging surface and used for regrouping the divergent light to form a concentrated light beam. The lens cover covers the light source and the spot lamp shade, and the lens cover is provided with a condensing part corresponding to the spot lamp shade, which is used to further enhance the condensing effect of the spot lamp shade and make the light more concentrated and bright.

In other embodiments (not shown in the figure), in order to improve the waterproof performance of the swimming pool lamp, a gasket can be arranged between the lens component and the light source board, and the gasket can be made of rubber or silica gel to prevent moisture from infiltrating into the swimming pool lamp, causing damage or short circuit of the light source; in order to increase the beauty and diversity of swimming pool lamps, color filters can be arranged on the lens component, which can be made of transparent or translucent materials with different colors such as red, green and blue, so as to change the light color of the light source, form different visual effects and increase the atmosphere and interest of the swimming pool; in order to increase the intelligence and convenience of swimming pool lamps, a control module can be set on the light source board. The control module can be made of electronic components such as microcontroller or single chip microcomputer to control the switch, brightness, color and other parameters of the light source. At the same time, it can communicate wirelessly with external remote controllers or intelligent terminals to realize remote or voice control and improve the user's experience and comfort.

Figure 2:
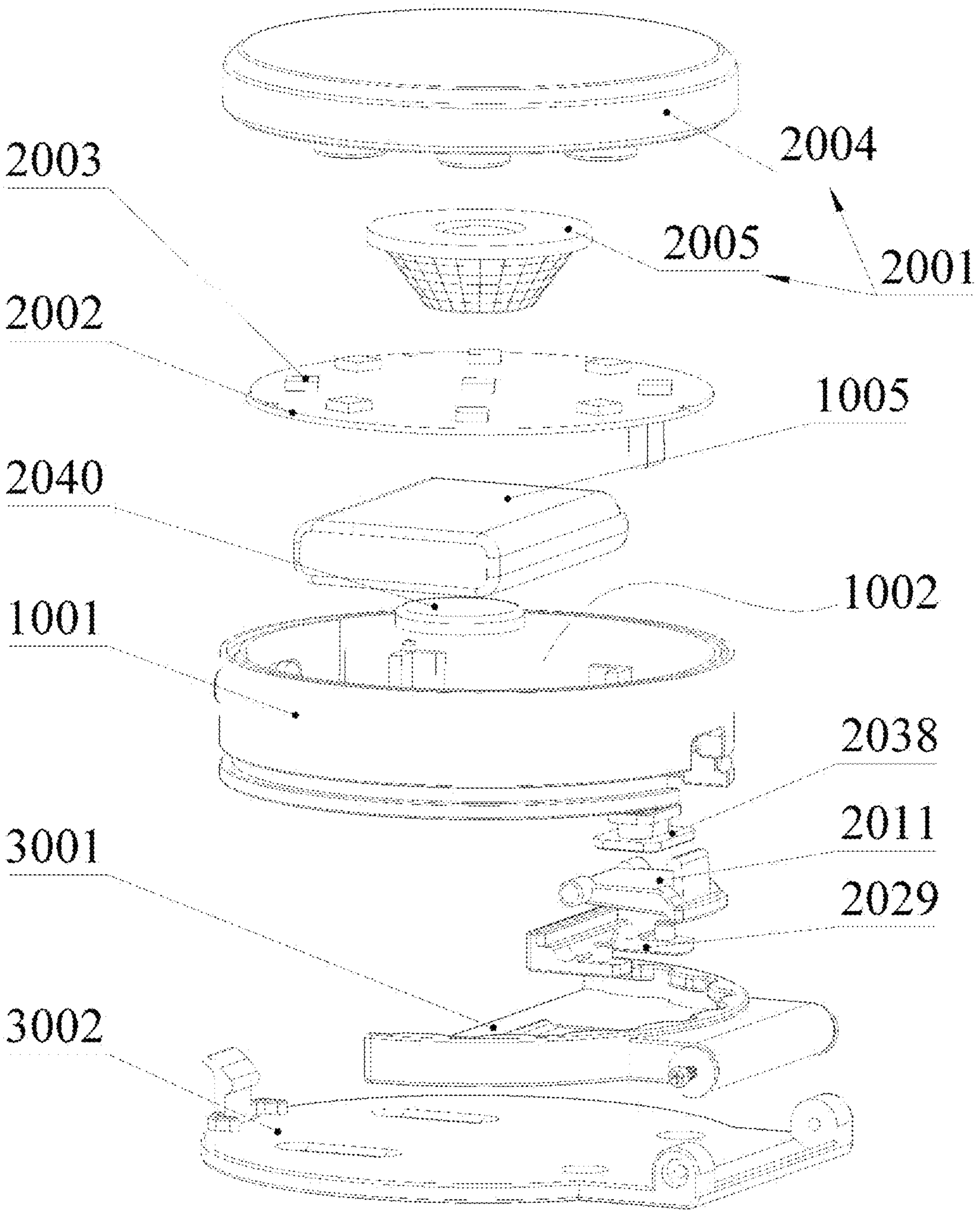
FIG. 2 is an exploded view of the lighting device.
Figure 3:
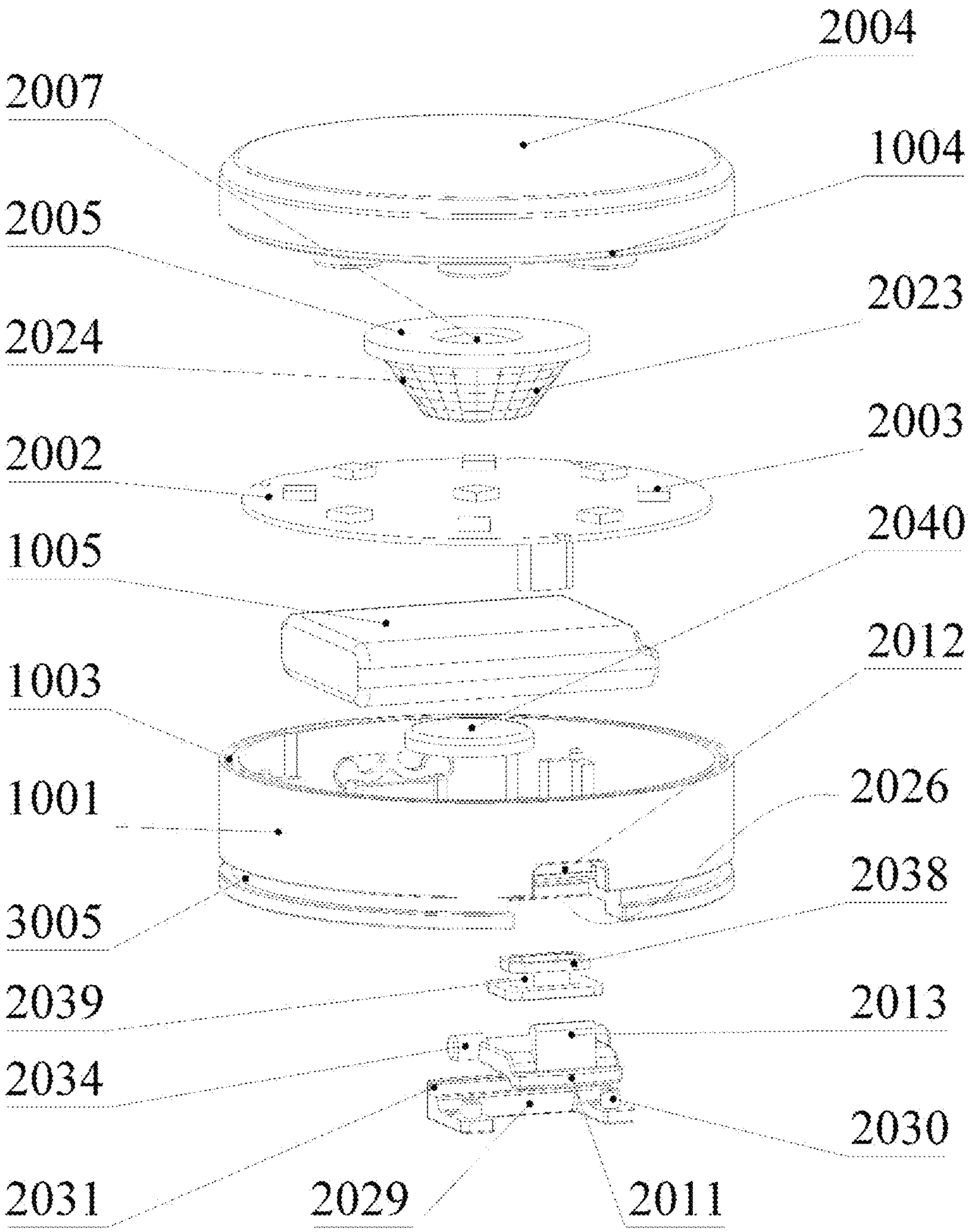
FIG. 3 is a partial schematic view of FIG. 2.
Figure 4:
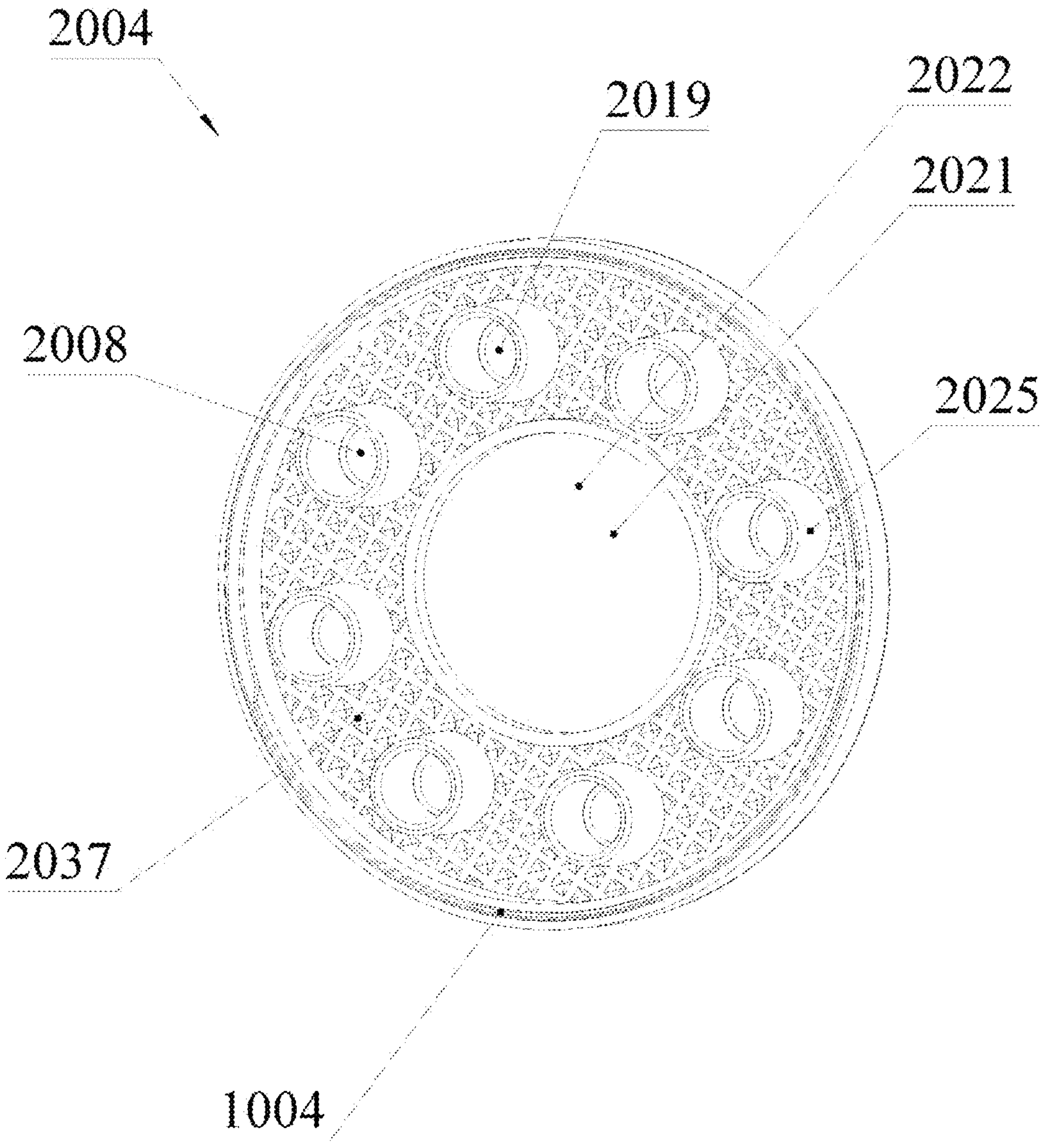
FIG. 4 is a schematic view of a lens cover.
Figure 5:
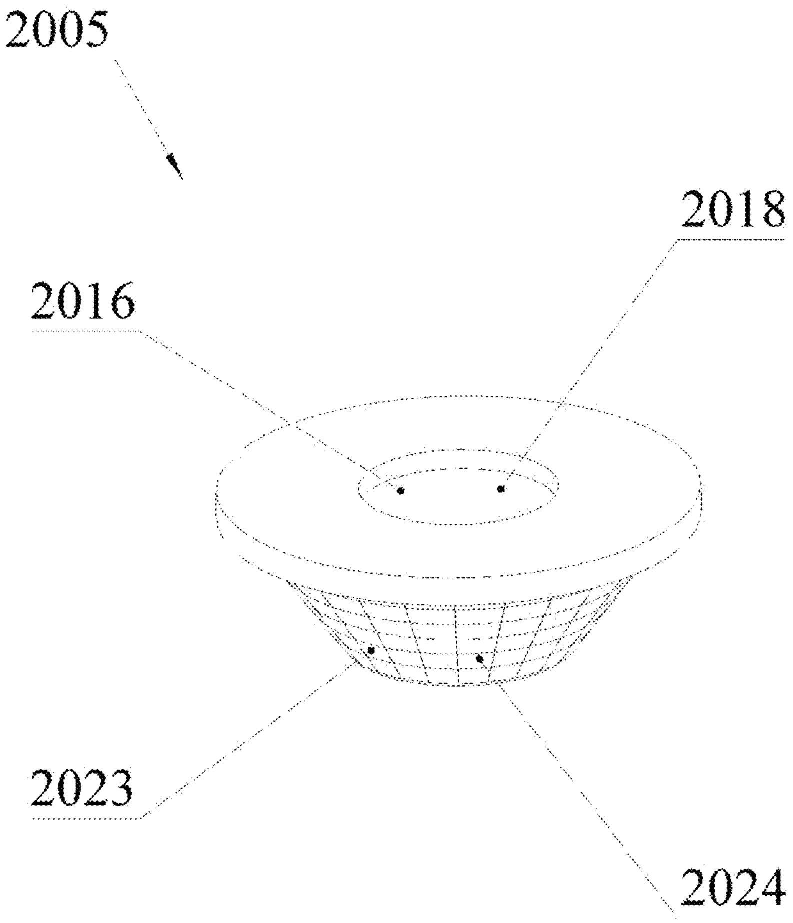
FIG. 5 is a schematic view of the spot lamp shade.
Figure 6:
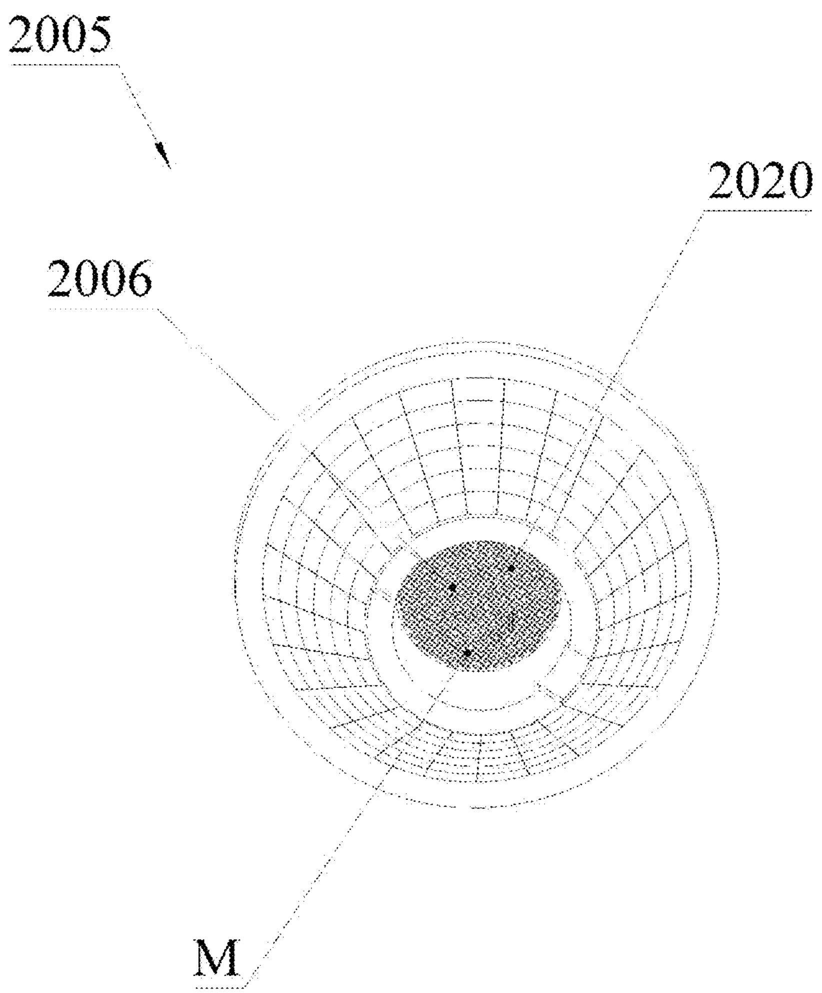
FIG. 6 is another schematic view of the spot lamp shade.
Figure 7:
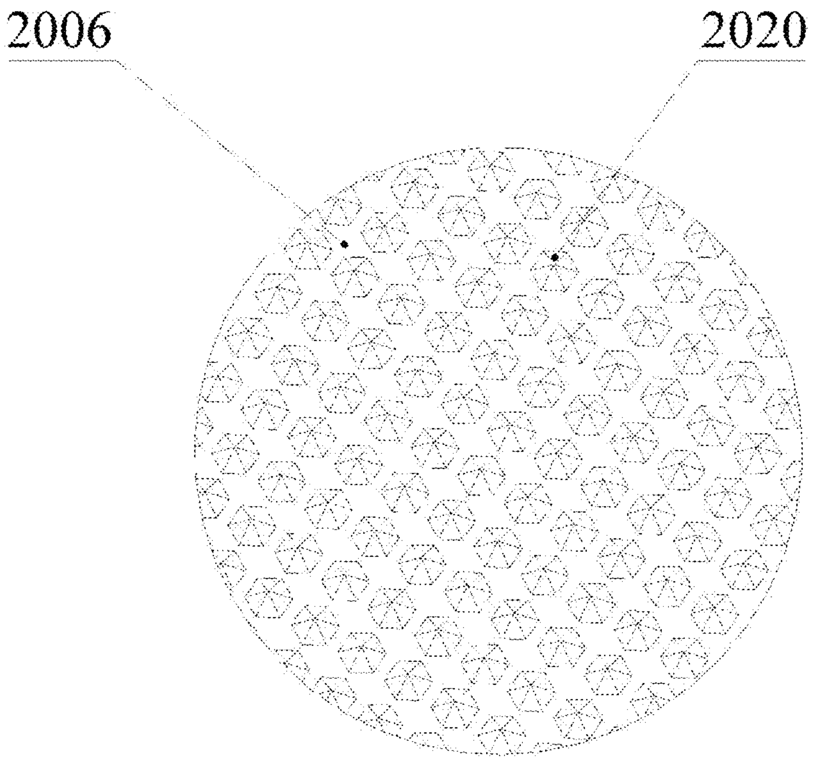
FIG. 7 is a schematic view at m in FIG. 6.
Figure 8:
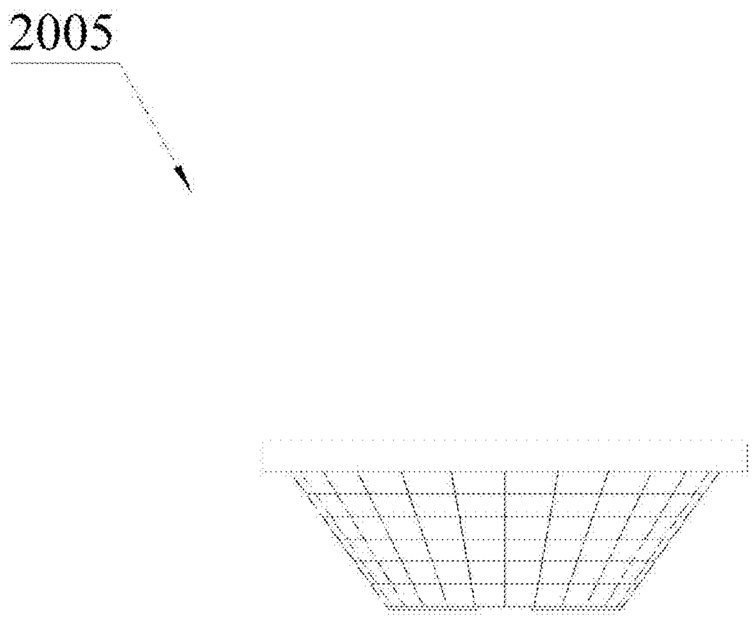
FIG. 8 is a side view of the spot lamp shade.

As shown in FIGS. 1 to 3, in this embodiment, the swimming pool lamp 2000 includes a housing 1001, and an accommodating groove 1002 is provided in the housing 1001, and a light source board 2002 and a spot lamp shade 2005 are arranged in the accommodating groove 1002 to ensure its stability and safety. Wherein, an embedding groove 1003 is formed on the housing 1001, which is used to cooperate with the lens cover 2004. The lens cover 2004 is provided with an embedding protrusion 1004 corresponding to the embedding groove 1003, wherein the lens cover 2004 is attached to the housing 1001 through the embedding protrusion 1004 and the embedding groove 1003.

Figure 12:
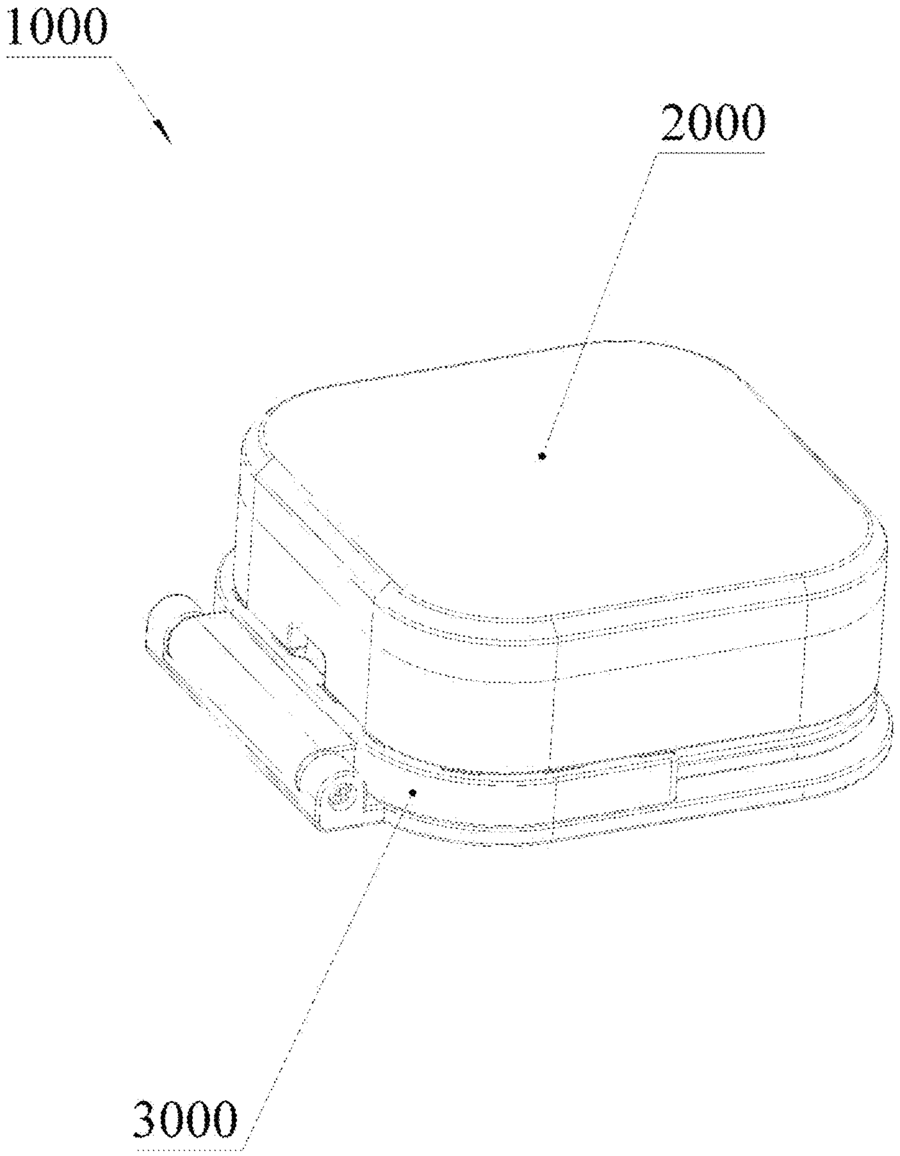
FIG. 12 is a schematic diagram of another embodiment of the lighting device.

In this embodiment, the lighting device 1000 has a substantially circular cross section. In other embodiments, the lighting device 1000 can be set as a square circle (as shown in FIG. 12), a square, an ellipse, a semicircle, a polygon and any desired geometric shape.

In this embodiment, the swimming pool lamp 2000 is further provided with a magnetic attraction member 2040 arranged in the accommodating groove 1002. The magnetic attraction member 2040 can attract the metal parts of the swimming pool by magnetic force, so as to realize the fixation and installation of the swimming pool lamp 2000. In other embodiments (not shown in the figure), the fixing and installation of swimming pool lamps are not limited to magnetic attraction, and suction cups, tapes, hooks, clips or any other fixing and installation methods that meet the design requirements can also be used.

In other embodiments (not shown in the figure), the lens cover is not limited to being attached to the housing through the embedding protrusion and embedding groove, but can also be set as snap connection, adhesive connection, screw connection, rivet connection, pin connection, welding, hook and loop connection and any desired connection mode.

As shown in FIGS. 1 to 3, in this embodiment, the swimming pool lamp 2000 further includes a rechargeable battery 1005 and a control button 1006, the control button 1006 is arranged on the housing 1001, and the rechargeable battery 1005 is arranged in the accommodating groove 1002.

In other embodiments (not shown in the figure), in order to increase the energy saving and environmental protection of swimming pool lamps, a photosensitive element can be arranged on the light source board, and the photosensitive element can be made of photoelectric elements such as photoresistors or photodiodes, so as to sense the light intensity of the environment and automatically adjust the brightness of the light source according to the change of the light intensity, avoid over-illumination or under-illumination, and achieve the purposes of energy saving and environmental protection. In addition, you can also set up a music module, a shooting module and any desired functional equipment.

As shown in FIGS. 1 to 7, in this embodiment, the spot lamp shade 2005 includes a first spot lamp part 2016, which includes a diverging surface 2006 and a condensing surface 2007. The diverging surface 2006 is provided with a plurality of first diffusing grooves 2017, and the condensing surface 2007 is set as a first convex mirror 2018. When the light passes through the spot lamp shade 2005, the light first scatters through the first diffusing groove 2017, and then passes through the first convex mirror to form a relatively uniform light beam, thus achieving a longer range.

In this embodiment, the first diffusing groove 2017 is set as a hexagonal tapered groove. In other embodiments (not shown in the figure), the first diffusing groove is not limited to being set as a hexagonal tapered groove, but can also be set as a circle, a square, a triangle, an ellipse and any desired geometric shape.

In other embodiments (not shown in the figure), in order to increase the adjustability and adaptability of swimming pool lamps, an adjusting device can be arranged on the spot lamp shade, and the adjusting device can be made of mechanical structures such as a rotating structure or a sliding structure to adjust the position and angle of the spot lamp shade, so as to change the direction and range of light, adapt to different swimming pool shapes and sizes, and meet different lighting requirements.

As shown in FIGS. 1 to 8, in this embodiment, the spot lamp shade 2005 includes a frustum wall 2023, on which a refraction surface 2024 is provided, and the spot lamp shade 2005 has a substantially trapezoidal cross section. The refraction surface 2024 is tiny convex surfaces formed in an array on the frustum wall 2023.

In other embodiments (not shown in the figure), the reflector is not limited to having a generally trapezoidal cross section, but can also be set as a circle, a square, an ellipse, a semicircle, a triangle and any desired geometric shape.

In other embodiments, in order to increase the innovation and personalization of swimming pool lamps, pattern decoration can be arranged on the spot lamp shade, and the pattern decoration can be made by carving, printing, stickers and the like so that different patterns, such as flowers, animals, characters and the like can be formed on the refraction surface or the condensing surface to change the shape and content of light, form different lighting effects, and increase the aesthetic feeling and personality of the swimming pool.

As shown in FIGS. 1 to 4, in this embodiment, a condensing part 2008 and a diffusing part 2037 are provided on the lens cover 2004 to achieve different optical effects. The condensing part 2008 is provided with a second convex mirror 2019 to form a strong light beam; the diffusing part 2037 is provided with a second diffusing groove 2020 for dispersing light in different directions to form a soft aureole.

In this embodiment, a plurality of second diffusing grooves 2020 are arrayed on the diffusing part 2037, and the second diffusing grooves 2020 are arranged as quadrangular conical grooves, which can effectively change the propagation direction and angle of light. In other embodiments (not shown in the figure), the second diffusing groove is not limited to being set as a quadrangular tapered groove, but can also be set as a circle, a square, a triangle, an ellipse and any desired geometric shape to achieve different optical effects.

Wherein, the condensing part 2008 includes a second spot lamp part 2021 corresponding to the first spot lamp part 2016, and the second spot lamp part 2021 is set as a third convex mirror 2022, which is used to further enhance the convergence degree of the light beam. The light beam formed in the first spot lamp is refracted by the third convex mirror, and the density and brightness of the light beam are significantly improved, so that the light beam can be emitted for a longer distance.

In other embodiments (not shown in the figure), the second diffusing groove is further provided with an adjustable shading sheet for controlling the light output and range of the diffusing part. By adjusting the position and angle of the shading sheet, the light of the diffusing part can be switched on and off to adapt to different environments and needs.

In other embodiments (not shown in the figure), the curvature and position of the second convex mirror 2019 and the third convex mirror 2022 can be adjusted as required to change the focal length and direction of the light beam of the condensing part. By adjusting the parameters of the second convex mirror 2019 and the third convex mirror 2022, the beam of the condensing part can be focused and deflected to adapt to different targets and scenes.

As shown in FIGS. 1 to 4, in this embodiment, the end face of the lens cover 2004 close to the light source board 2002 is provided with a condensing wall 2025, which corresponds to the light source 2003 and is used for guiding the light emitted by the light source 2003 to the condensing part 2008. The condensing wall 2025 extends along the periphery of the condensing part 2008 to form a closed space, which can effectively prevent the scattering and loss of light and improve the utilization rate and condensing effect of light.

As shown in FIGS. 1 to 9, in this embodiment, the swimming pool lamp 2000 is also equipped with a charging port 2009 and a waterproof component 2010 for providing power and protection for the swimming pool lamp 2000. The charging port 2009 is installed on the outer surface of the housing 1001. The charging port 2009 is an interface for connecting the rechargeable battery 1005 with an external power supply for charging or discharging the rechargeable battery 1005. The waterproof component 2010 is matched with the charging port 2009. The waterproof component 2010 is rotatably fixed on the housing of the swimming pool lamp 2000 to cover and seal the charging port 2009 to prevent moisture and sundries from entering the charging port 2009 and causing short circuit or damage.

In other embodiments (not shown in the figure), the inner surface of the condensing wall is further provided with a reflective layer for increasing the reflectivity and brightness of light. The reflective layer can be made of metal, glass, plastic or other materials with reflective properties. The reflective layer can cover the whole inner surface of the condensing wall or part of the inner surface as required to achieve different optical effects.

In other embodiments (not shown in the figure), a solar panel is also arranged on the outer surface of the lighting device, which is used to provide power for the swimming pool lamps by using solar energy. The solar panel can be made of silicon, cadmium, copper or other materials with photoelectric conversion performance. The solar panel can cover the whole outer surface of the lighting device, or cover part of the outer surface as required to achieve different power outputs.

In other embodiments (not shown in the figure), a connector 3009 is arranged on the swimming pool lamp 2000, and the connector 3009 can automatically adjust the parameters such as brightness, color and flashing frequency of the swimming pool lamp 2000 according to the parameters such as temperature, flow rate and turbidity of the pool water, so as to realize intelligent lighting control; a waterproof layer 3010 is arranged on the swimming pool lamp 2000, which can effectively prevent moisture from invading the inside of the swimming pool lamp 2000, thereby protecting the circuits and components of the swimming pool lamp 2000 and prolonging the service life of the swimming pool lamp 2000; an alarm 3011 is arranged on the swimming pool lamp 2000, which can send out an acousto-optic signal when the swimming pool lamp 2000 fails or is abnormal, so as to remind users to check and repair the swimming pool lamp 2000 in time and avoid causing greater losses.

As shown in FIGS. 1 to 9, in this embodiment, a waterproof component 2010 is detachably connected to the swimming pool lamp 2000, and the waterproof component 2010 includes a waterproof plug 2011 and a fixing member 2029 for protecting the internal circuits and elements of the swimming pool lamp 2000. The waterproof component 2010 can be detached or installed on the swimming pool lamp 2000 as required, which is convenient for the maintenance and replacement of the swimming pool lamp 2000. The housing 1001 is provided with a waterproof groove 2026, and the shape of the waterproof groove 2026 is adapted to the shape of the waterproof plug 2011, and the waterproof plug 2011 is arranged in the waterproof groove 2026 to form a sealed space to prevent moisture and sundries from infiltrating into the interior of the swimming pool lamp 2000. The edge of the waterproof groove 2026 is provided with a buckling groove 2012, and the waterproof plug 2011 is provided with a limiting protrusion 2013 corresponding to the buckling groove 2012. The number and position of the buckling grooves 2012 correspond to the number and position of the limiting protrusion 2013 on the waterproof plug 2011, and the waterproof plug 2011 is detachably connected to the swimming pool lamp 2000 through the buckling groove 2012 and the limiting protrusion 2013.

As shown in FIGS. 1 to 9, in this embodiment, the waterproof component 2010 further includes a sealing ring 2038, which corresponds to the charging port 2009 and closely abuts against the charging port 2009. The sealing ring 2038 is provided with an abutting groove 2039 corresponding to the charging port 2009, and the sealing ring 2038 is arranged in the charging port through the abutting groove 2039. When the limiting protrusion 2013 is inserted into the buckling groove 2012, the waterproof plug 2011 closely adheres to the scaling ring 2038 to form a seal. In some embodiments, the sealing ring and the waterproof plug are integrally formed and fixedly connected, or the sealing ring and the charging port can be integrally formed and fixedly connected. In other embodiments (not shown in the figure), the waterproof plug is not limited to being detachably attached to the housing through the limiting protrusion and the buckle groove, but also can be set as screw connection, pin connection, rivet connection, hook and loop connection, adhesive connection, welding and any desired connection mode to meet different use requirements and occasions.

In this embodiment, the waterproof plug 2011 is made of silica gel. In other embodiments, the material of the waterproof plug 2011 is not limited to silica gel, but can also be made of rubber, plastic, metal or other materials with waterproof performance and durability to improve the waterproof performance and service life of the waterproof plug 2011.

Figure 9:
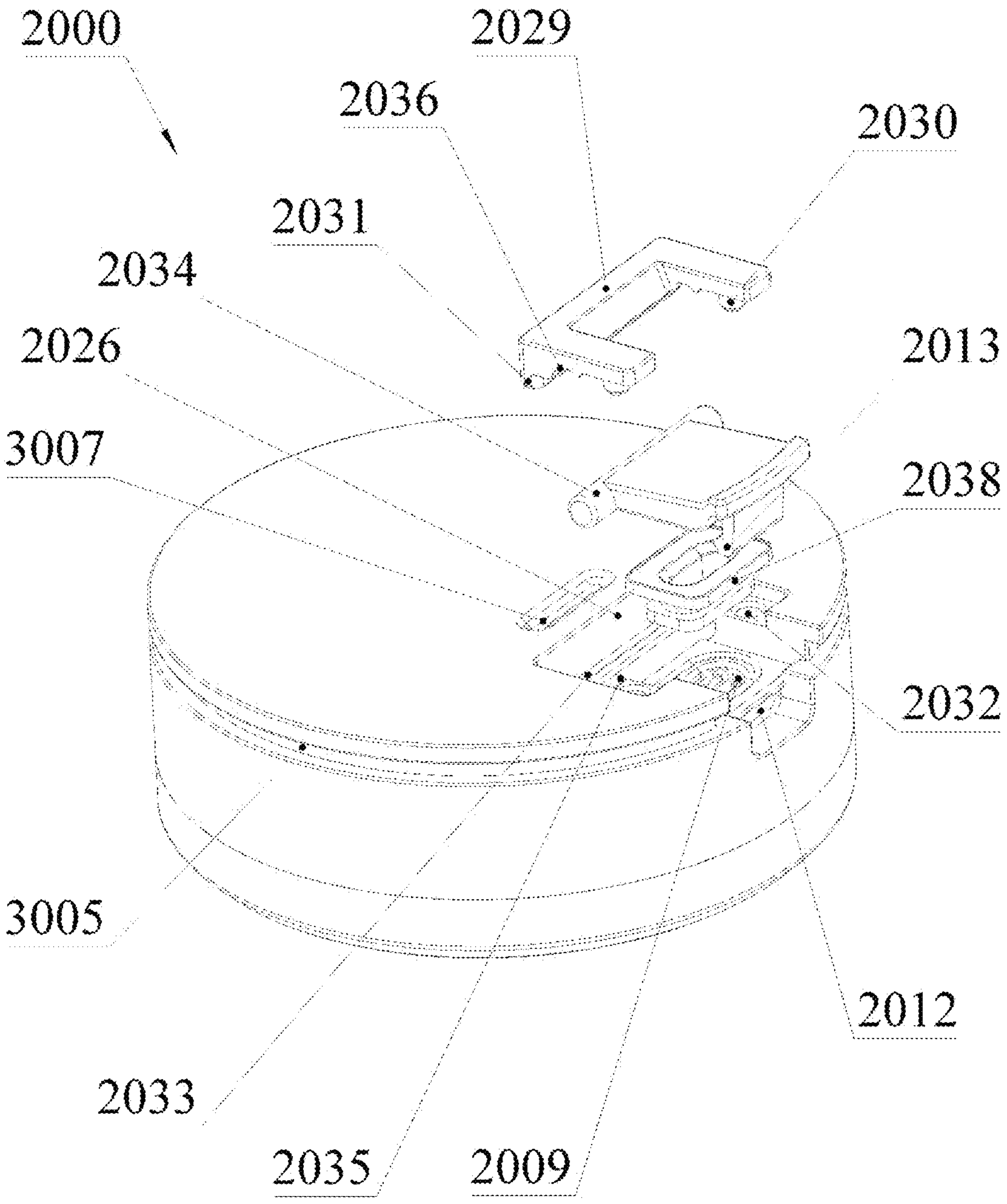
FIG. 9 is a partial explosion of the lighting device.

As shown in FIG. 9, in this embodiment, the fixing member 2029 includes a first fixing part 2030 and a second fixing part 2031, and the waterproof groove 2026 is provided with a first fixing groove 2032 and a second fixing groove 2033; the first fixing groove correspond to the first fixing part 2030 and the second fixing groove 2033 correspond to the second fixing part 2031; the fixing member 2029 fixedly connected in the waterproof groove 2026 through the first fixing part 2030, the second fixing part 2031 the first fixing groove 2032 and the second fixing groove 2033. The fixing member 2029 is arranged on the outer surface of the waterproof plug 2011, and its function is to enhance the connection strength and stability between the waterproof plug 2011 and the housing 1001 and prevent the waterproof plug 2011 from loosening or falling off during use.

In other embodiments (not shown in the figure), the fixing member is not limited to being fixedly connected in the waterproof groove through the first fixing part, the second fixing part, the first fixing groove and the second fixing groove, but also can be arranged as hook and loop connection, adhesive connection, welding and any other connection methods that are in line with wishes.

As shown in FIG. 9, in this embodiment, the waterproof plug 2011 includes a rotating part 2034, a first rotating groove 2035 is arranged in the waterproof groove 2026, and a second rotating groove 2036 is arranged on the fixing member 2029, and the rotating part 2034 is arranged in the first rotating groove 2035 and the second rotating groove 2036, wherein the waterproof plug 2011 is rotatably connected with the swimming pool lamp 2000 through the fixing member 2029.

In other embodiments (not shown in the figure), the waterproof plug is not limited to the rotatable connection with the swimming pool lamp through the fixing member, but can also be set as bearing connection, gear connection, chain connection, belt connection and any desired connection modes.

As shown in FIGS. 1 to 11, in this embodiment, the lighting device 1000 further includes an angle adjusting seat 3000, which is arranged below the swimming pool lamp 2000, wherein the angle adjusting seat 3000 includes a rotating table 3001 and a fixed table 3002, and the rotating table 3001 and the fixed table 3002 are rotatably connected.

In this embodiment, the maximum angle that the rotating table 3001 and the fixed table 3002 can rotate is 160°. In other embodiments, the maximum rotatable angle of the rotating table and the fixed table is not limited to 160°, but can also be set to 130°, 270°, 360° and any desired angle.

Specifically, the fixed table 3002 is provided with a first fixing hole 3003, and the rotating table 3001 is provided with a second fixing hole 3004, which corresponds to the first fixing hole 3003. The rotating table 3001 and the fixed table 3002 are rotatably connected through a connector 3009.

In other embodiments (not shown in the figure), the rotating table and the fixed table are not limited to being fixedly connected by connecting pieces, but can also be arranged as hook and loop connection, adhesive connection, welding and any desired connection mode.

In other embodiments (not shown in the figure), a controller is arranged on the rotating table, and the controller can communicate with the swimming pool lamps through wireless signals or wired signals, so as to realize remote control of the parameters such as switch, brightness and color of the swimming pool lamps; a spring is arranged between the rotating table and the fixed table, which can make the rotating table elastically deform under the action of external force, thus increasing the stability and durability of the angle adjusting seat; a display is arranged on the rotating table, which can display the current state of the swimming pool lamp, the current angle of the angle adjusting seat, the current setting of the controller and other information, thus facilitating the user to monitor and adjust the lighting device.

Figure 10:
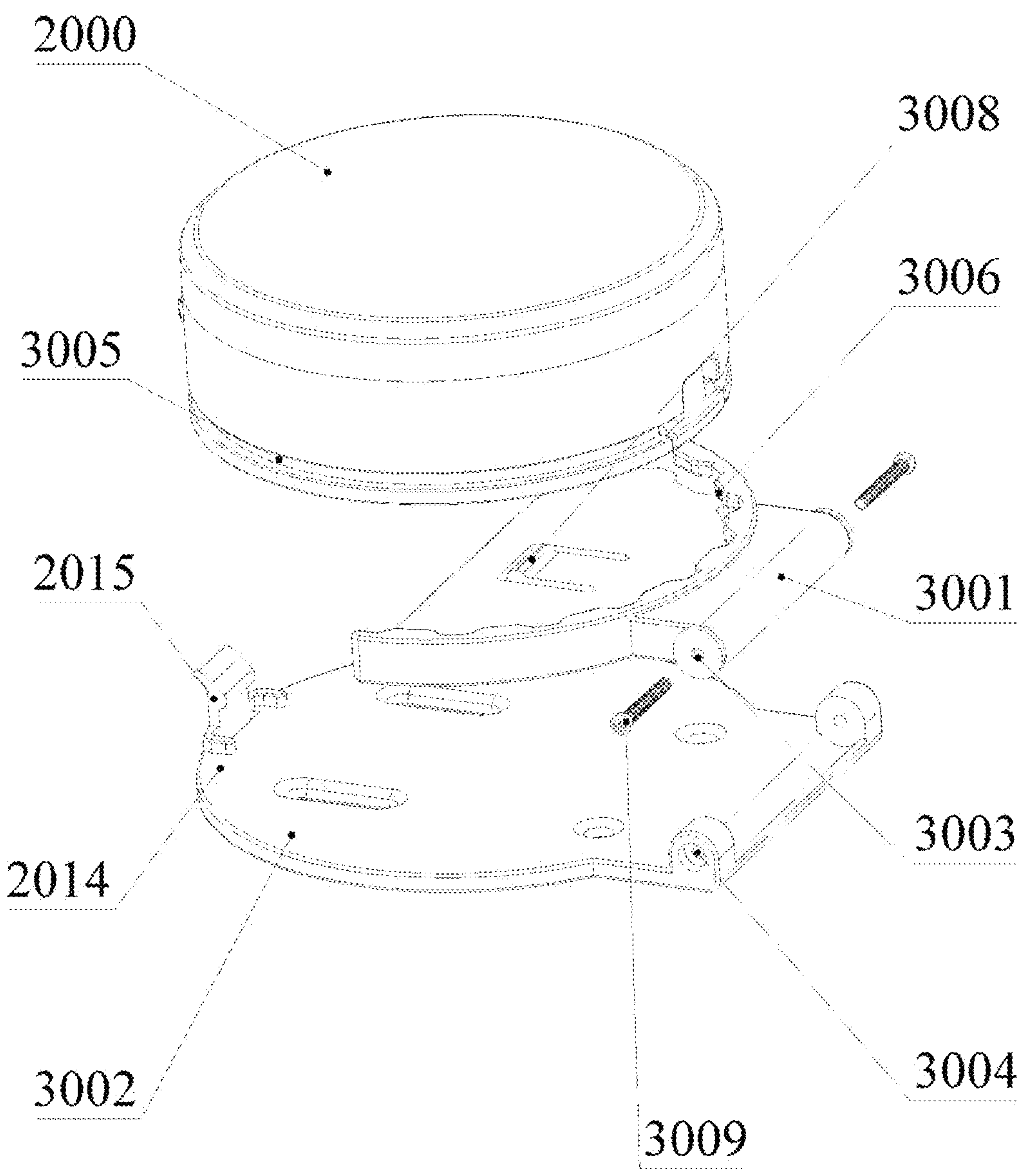
FIG. 10 is a partial explosion of the lighting device.
Figure 11:
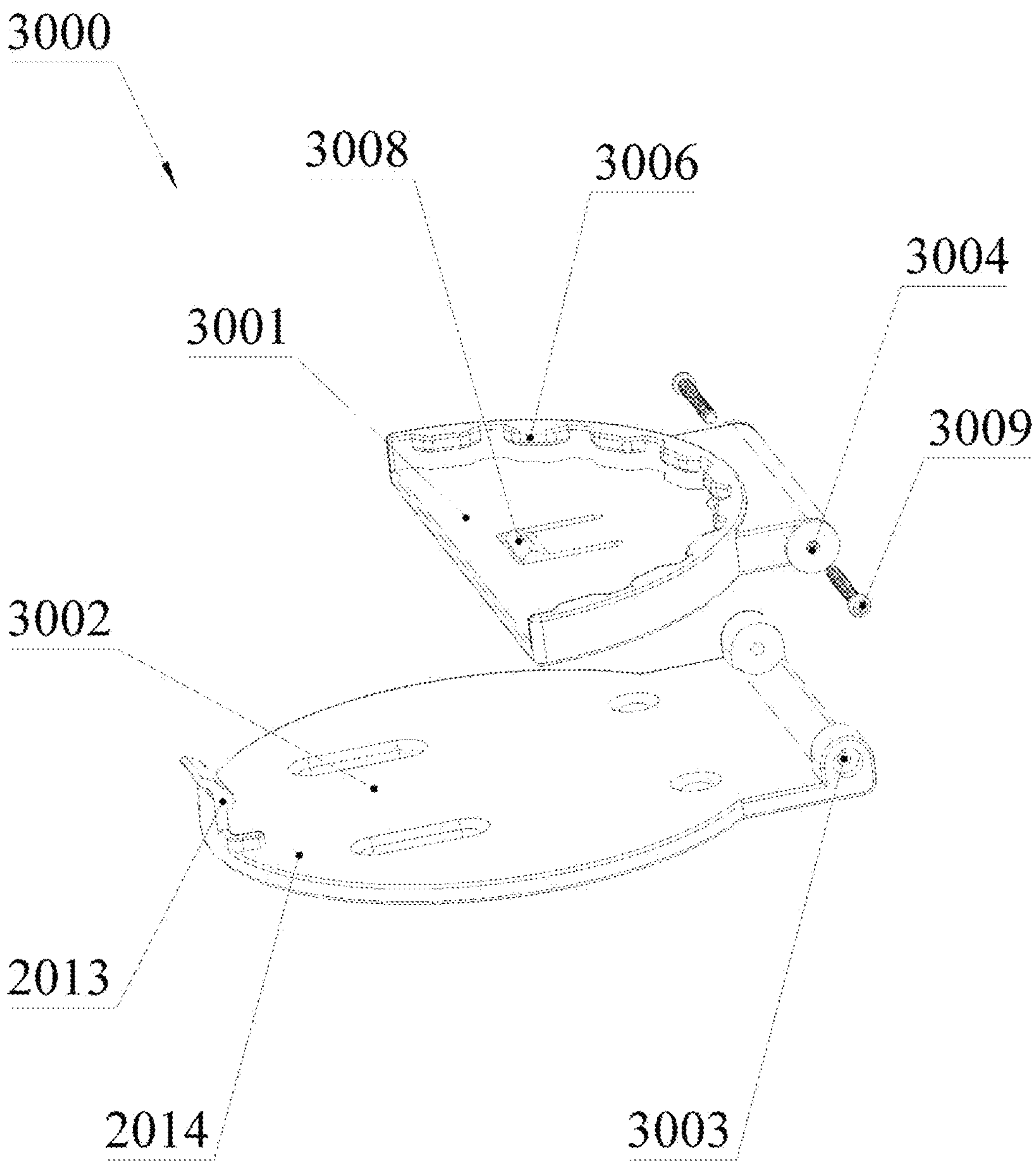
FIG. 11 is an exploded view of the angle adjusting seat.

As shown in FIGS. 10 to 11, in this embodiment, the swimming pool lamp 2000 is provided with a fixing ring groove 3005, and the rotating table 3001 is provided with a fixing protrusion 3006, which corresponds to the fixing ring groove 3005. The swimming pool lamp 2000 is further provided with a limiting groove 3007, and the rotating table 3001 is provided with a limiting part 3008, which corresponds to the limiting groove 3007; the rotating table 3001 is detachably connected with the swimming pool lamp 2000 through the fixing ring groove 3005, the fixing protrusion 3006, the limiting groove 3007 and the limiting part 3008.

In this embodiment, the rotating table 3001 and the housing 1001 are detachably connected through the fixing ring groove 3005, the fixing protrusion 3006, the limiting groove 3007 and the limiting part 3008. In other embodiments (not shown in the figure), the rotating table and the swimming pool lamp are not limited to being detachably connected by fixing ring grooves, fixing protrusions, limiting grooves and limiting parts, but also can be connected by screws, pins, rivets, hook and loop, adhesives, welding and any other desired connection methods.

As shown in FIGS. 10 to 11, in this embodiment, the fixed table 3002 includes a free end 2014, and the free end 2014 is provided with a fixing hook 2015 corresponding to the fixing ring groove 3005, and the fixed table 3002 is detachably connected with the swimming pool lamp 2000.

In this embodiment, the fixing table 3002 is detachably connected with the swimming pool lamp 2000 through the fixing hook 2015 and the fixing ring groove 3005. In other embodiments (not shown in the figure), the fixing table and the swimming pool lamp are not limited to being detachably connected through the fixing hook and the fixing ring groove, but also can be arranged as screw connection, pin connection, rivet connection, hook and loop connection, adhesive connection, welding and any desired connection mode.

In other embodiments (not shown in the figure), a sensor is arranged on the fixed table, and the sensor can detect the connection state between the fixed table and the pool lamp, thus realizing intelligent management and optimization of the connection mode; a regulator is arranged on the fixed table, and the regulator can adjust the connection strength between the fixed table and the pool lamp according to the user's demand or the change of the environment, so as to realize flexible adjustment and control of the connection mode; an indicator is arranged on the fixed table, which can display information such as connection mode, connection state and connection parameters between the fixed table and the swimming pool lamp, so as to facilitate users to monitor and evaluate the connection mode.

The present invention further provides a swimming pool decoration method, which includes the following steps: providing a plurality of powerful lighting devices for the swimming pool;

wherein the lighting device includes a swimming pool lamp, wherein a lens component and a light source board are arranged in the swimming pool lamp, and the lens component is arranged on the light source board, wherein the swimming pool lamp is provided with a charging port and a waterproof component corresponding to the charging port; and an angle adjusting seat detachably connected below the swimming pool lamp, wherein the angle adjusting seat includes a rotating table and a fixed table, and the rotating table and the fixed table are rotatably connected; and the decoration method includes the following steps:

charging the lighting devices sufficiently; and fixing the lighting devices in the swimming pool where lighting is needed; and rotating the angle adjusting seat to adjust the light of the swimming pool lamp to a required angle.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A rechargeable submersible pool lighting device, comprising:

a swimming pool lamp, wherein a lens component and a light source board are arranged in said swimming pool lamp, and said lens component is arranged on said light source board, wherein said swimming pool lamp is provided with a charging port and a waterproof component corresponding to said charging port; and an angle adjusting seat arranged below said swimming pool lamp, wherein said angle adjusting seat comprises a rotating table and a fixed table, and said rotating table and said fixed table are rotatably connected; and wherein, said rotating table is detachably connected with said swimming pool lamp, a fixing ring groove is arranged on said swimming pool lamp, a fixing protrusion is arranged on said rotating table, and said fixing protrusion corresponds to said fixing ring groove; a limiting groove is also arranged on said swimming pool lamp, and a limiting part is arranged on said rotating table, and said limiting part corresponds to said limiting groove; and wherein, said fixed table comprises a free end, and a fixing hook is arranged at said free end, and said fixing hook corresponds to said fixing ring groove; and said fixed table is detachably connected with said swimming pool lamp.

2. The rechargeable submersible pool lighting device according to claim 1, wherein a plurality of light emitting sources are arranged on said light source board, and said lens component comprises a lens cover and an spot lamp shade, wherein said spot lamp shade is arranged on said plurality of light emitting sources and comprises a diverging surface and a condensing surface; and said lens cover is arranged on said plurality of light emitting sources and said spot lamp shade, and a condensing part is arranged on said lens cover, and said condensing part corresponds to said spot lamp shade.

3. The rechargeable submersible pool lighting device according to claim 2, wherein said spot lamp shade comprises a first spot lamp part, which comprises said diverging surface and said condensing surface, wherein a plurality of first diffusing grooves are arranged on said diverging surface, and said condensing surface is set as a first convex mirror.

4. The rechargeable submersible pool lighting device according to claim 3, wherein said lens cover is provided with said condensing part and a diffusing part, said condensing part is provided with a second convex mirror, and said diffusing part is provided with a second diffusing groove; and wherein, said condensing part comprises a second spot lamp part corresponding to said first spot lamp part, and said second spot lamp part is set as a third convex mirror.

5. The rechargeable submersible pool lighting device according to claim 1, wherein said waterproof component is rotatably connected to said swimming pool lamp, and said waterproof component comprises a waterproof plug; and wherein, a waterproof groove is arranged on said swimming pool lamp, and said waterproof plug is arranged in said waterproof groove; a buckling groove is arranged on said waterproof groove, a limiting protrusion is arranged on said waterproof plug, and said limiting protrusion corresponds to said buckling groove; and said waterproof plug is detachably connected to said swimming pool lamp through said buckling groove and said limiting protrusion.

6. The rechargeable submersible pool lighting device according to claim 5, wherein said waterproof component further comprises a fixing member, which comprises a first fixing part and a second fixing part, and a first fixing groove and a second fixing groove are arranged in said waterproof groove; and said first fixing groove corresponds to said first fixing part and said second fixing groove corresponds to said second fixing part; and said fixing member fixedly connected in said waterproof groove through said first fixing part and said second fixing part, said first fixing groove and said second fixing groove.

7. The rechargeable submersible pool lighting device according to claim 6, wherein said waterproof plug comprises a rotating part, a first rotating groove is arranged in said waterproof groove, and a second rotating groove is arranged on said fixing member; and said rotating part is arranged in said first rotating groove and said second rotating groove, wherein said waterproof plug is rotatably connected with said swimming pool lamp through said fixing member.

8. The rechargeable submersible pool lighting device according to claim 1, wherein said fixed table is provided with a first fixing hole, and said rotating table is provided with a second rotating hole corresponding to said first fixing hole, and said rotating table and said fixed table are rotatably connected through a connector.

9. A rechargeable submersible pool lighting device, comprising:

a swimming pool lamp, wherein a lens component and a light source board are arranged in said swimming pool lamp, a plurality of light emitting sources are arranged on said light source board, and said lens component is covered on said light source board; and wherein, said lens component comprises a lens cover and a spot lamp shade, wherein said spot lamp shade is arranged on said plurality of light emitting sources, and said spot lamp shade comprises a diverging surface and a condensing surface; said lens cover is arranged on said plurality of light emitting sources and said spot lamp shade, and a condensing part is arranged on said lens cover, and said condensing part corresponds to said spot lamp shade; and wherein said swimming pool lamp is provided with a charging port and a waterproof component corresponding to said charging port, and said waterproof component is rotatably connected to said swimming pool lamp; and wherein, said waterproof component comprises a waterproof plug, which is detachably connected to said swimming pool lamp, and said swimming pool lamp is provided with a buckling groove, and a limiting protrusion is arranged on said waterproof plug, and said limiting protrusion corresponds to said buckling groove; and an angle adjusting seat detachably connected below said swimming pool lamp, wherein said angle adjusting seat comprises a rotating table and a fixed table, and said rotating table and said fixed table are rotatably connected.

10. The rechargeable submersible pool lighting device according to claim 9, wherein said swimming pool lamp is provided with a fixing ring groove, said rotating table is provided with a fixing protrusion corresponding to said fixing ring groove; said swimming pool lamp is further provided with a limiting groove, said rotating table is provided with a limiting part corresponding to said limiting groove; and said rotating table and said swimming pool lamp pass through said fixing ring groove, and said fixing protrusion, said limiting groove and said limiting part are detachably connected.

11. The rechargeable submersible pool lighting device according to claim 10, wherein said fixed table comprises a free end, and a fixing hook is arranged at said free end, and said fixing hook corresponds to said fixing ring groove, and said fixed table is detachably connected with said swimming pool lamp.

12. The rechargeable submersible pool lighting device according to claim 11, wherein said spot lamp shade comprises a first spot lamp part, which comprises said diverging surface and said condensing surface, wherein a plurality of first diffusing grooves are arranged on said diverging surface, and said condensing surface is set as a first convex mirror.

13. The rechargeable submersible pool lighting device according to claim 12, wherein said lens cover is provided with said condensing part and a diffusing part, said condensing part is provided with a second convex mirror, and said diffusing part is provided with a second diffusing groove; and wherein, said condensing part comprises a second spot lamp part corresponding to said first spot lamp part, and said second spot lamp part is set as a third convex mirror.

14. The rechargeable submersible pool lighting device according to claim 13, wherein said spot lamp shade comprises a frustum wall, and a refraction surface is arranged on said frustum wall; and wherein, said spot lamp shade has a substantially trapezoidal cross section.

15. The rechargeable submersible pool lighting device according to claim 14, wherein a condensing wall is arranged on the end face of said lens cover closest to said light source board, and said condensing wall corresponds to said plurality of light emitting sources.

16. The rechargeable submersible pool lighting device according to claim 9, wherein a waterproof groove is arranged on said swimming pool lamp, said waterproof plug is arranged in said waterproof groove, said buckling groove is arranged on said waterproof groove, and said limiting protrusion is arranged on said waterproof plug, said limiting protrusion corresponds to said buckling groove, and said waterproof plug is detachably connected to said swimming pool lamp through said buckling groove and said limiting protrusion.

17. The rechargeable submersible pool lighting device according to claim 16, wherein said waterproof component further comprises a fixing member, which comprises a first fixing part and a second fixing part, and a first fixing groove and a second fixing groove are arranged in said waterproof groove; and said first fixing groove corresponds to said first fixing part, said second fixing groove corresponds to said second fixing part, and said fixing member fixedly connected in said waterproof groove through said first fixing part, said second fixing part, said first fixing groove and said second fixing groove.

18. The rechargeable submersible pool lighting device according to claim 17, wherein said waterproof plug comprises a rotating part; a first rotating groove is arranged in said waterproof groove, and a second rotating groove is arranged on said fixing member; and said rotating part is arranged in said first rotating groove and said second rotating groove, wherein said waterproof plug is rotatably connected with said swimming pool lamp through said fixing member.

19. The rechargeable submersible pool lighting device according to claim 9, wherein said fixed table is provided with a first fixing hole, and said rotating table is provided with a second fixing hole corresponding to said first fixing hole, and said rotating table and said fixed table are rotatably connected through a connector.

* * * * *